United States Patent

Breazeale

[15] 3,643,029

[45] Feb. 15, 1972

[54] COMMUNITY WARNING SYSTEM USING TELEPHONE LINES

[72] Inventor: Paul H. Breazeale, 1646 St. Louis St., Springfield, Mo. 65802

[22] Filed: Feb. 10, 1970

[21] Appl. No.: 9,469

[52] U.S. Cl. ....................179/5 R
[51] Int. Cl. ....................H04m 11/04
[58] Field of Search ....................179/2 R, 2.5, 2.5 B, 5 R

[56] References Cited

UNITED STATES PATENTS 3,519,749 7/1970 Kline....................179/5 X

*Primary Examiner*—Ralph D. Blakeslee
*Attorney*—Clarence A. O'Brien and Harvey B. Jacobson

[57] ABSTRACT

A transmitter unit at a central telephone office includes audio generators connected to a stepping switch which sequentially completes communication between the central office unit and connected subscriber stations. In order to properly receive an alarm signal produced by the audio generator, a subscriber receiver unit is connected in parallel with the usual telephone lines at the subscriber station. The receiver unit includes a frequency detector for sensing transmission of an alarm signal from the central office unit. A speaker is connected to the frequency detector for manifesting an alarm condition.

12 Claims, 4 Drawing Figures

Paul H. Breazeale
INVENTOR.

BY Clarence A. O'Brien
and Harvey B. Jacobson
Attorneys

Paul H. Breazeale
INVENTOR.

BY Clarence A. O'Brien
and Harvey B. Jacobson
Attorneys

Paul H. Breazeale
INVENTOR.
BY Clarence A. O'Brien and Harvey B. Jacobson
Attorneys

COMMUNITY WARNING SYSTEM USING TELEPHONE LINES

The present invention relates to an alarm system utilizing telephone lines.

At the present time, it is highly desirable to have a community warning system which alerts individuals of impending disasters such as hurricanes, earthquakes, floods and the like. Although the broadcasting media alerts listeners, they cannot reach individuals who do not have their receivers turned on.

The present invention is directed to an alarm communication system, which utilizes the ordinary telephone lines between a central office and associated subscriber stations. The present invention permits sequential alert of all subscriber stations by manifesting an audio alarm at the subscriber station. Sounding of an alarm allows ample opportunity for individuals to brace themselves for an impending disaster. If the alarm can be sounded timely, members of the community may be able to evacuate.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
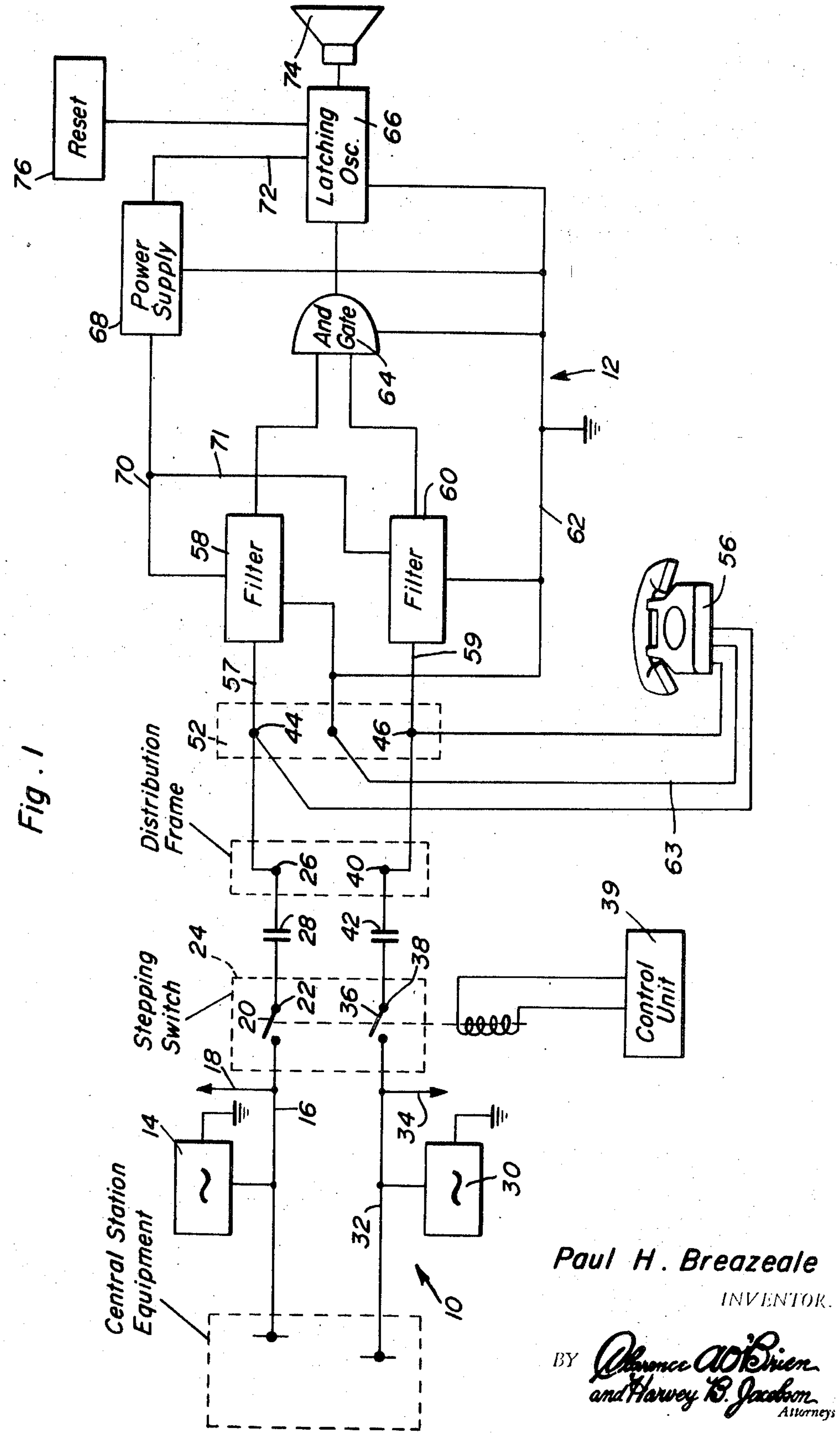
FIG. 1 is a system block diagram illustrating the principle components of a preferred embodiment of the present invention.

Referring to the drawings and more particularly FIG. 1, a transmitting unit 10 is to be located at the central telephone office and is adapted to communicate with a subscriber receiver unit 12 located at a subscriber station. More particularly, the central office unit 10 includes a first audio generator "A" (14) having its output connected to a tip lead bus 16. A tapoff lead 18 is connected between the bus and stationary contact of a switch 20. The terminal 22 of switch 20 is connected to a terminal 26 of a distribution frame through a coupling capacitor 28. Switch 20 is one section of a conventional electromechanical stepping switch generally indicated by 24. When switch 20 closes, the signal produced by audio generator 14 is transmitted through the stepping switch 24 to the terminal 26. As illustrated in phantom, other switch sections are included in the stepping switch 24 and serve to connect the audio generator 14 with other subscriber units (not shown). The stepping switch 24 allows sequential communication between audio generator 14 and the various subscriber units associated therewith.

A second audio generator "B" (30) generates a signal at a second frequency. As in the case of the first-mentioned audio generator, the generator 30 has its output connected to a bus referred to as the ring lead bus 32. The tapoff lead 34 connects the ring lead bus to a stationary contact of a switch 36. The terminal 38 of switch 36 is connected to terminal 40 in the distribution frame by a coupling capacitor 42. Other switch sections similar to switch section 36 connect the audio generator 30 to subscriber units (not shown). An form part of the stepping switch 24. During normal operation of stepping switch 24, both switch sections 20 and 36 become closed and opened together. After the switch sections 20 and 36 have been opened, the following switch sections in the stepping switch assembly 24 are closed together to cause transmission of the signals from audio generators 14 and 30 to another subscriber unit (not shown). Electromagnetic actuation of the stepping switch 24 is derived from a control unit 39 usually incorporated in a single housing with the switch sections. The stepping switches of the type described are in common use and typically manufactured by the Potter and Brumfield Company.

At the subscriber unit 12, the tip lead 44 and ring lead 46 are respectively connected to the output terminals 26 and 40. These in turn are connected to a connector block 52. The connector block allows parallel connection between the tip and ring leads with the usual telephone instrument 56. Lead 57 connects the tip lead 44 to an active filter "A" (58). In a similar manner, a lead 59 connects ring lead 46 to active filter "B" (60). The connection of these leads is completed through connector block 52. A circuit ground 62 for both filters 58 and 60 is achieved through the grounded telephone set lead 63, which also passes through the connector block 52. The particular form of the active filters 58 and 60 are discussed in more detail hereinafter.

Thus far, in operation of the invention, during an emergency situation, subscriber unit 12 simultaneously receives signals (of different frequencies) from audio generators 14 and 30 at the central unit 10. The received signals are operated upon by filters 58 and 60 which produce output signals at different frequencies that become simultaneously applied to detection means in the form of an AND-gate 64. The AND gate becomes enabled only when signals are simultaneously passed by filters 58 and 60. Utilization of different frequencies for enabling the AND gate minimizes the likelihood of erroneous enablement due to spurious noise present in the subscriber unit 12. The single output from AND-gate 64 is applied to a latching oscillator 66 which goes into a free running mode upon the application of an output signal from the AND-gate 64. The latching oscillator may be of the astable multivibrator type capable of sustaining oscillation until externally reset.

A DC power supply 68 provides bias power to active filters 58 and 60 through power leads 70 and 71, respectively. The power lead 72 connects the power supply 68 with the bias circuits of the latching oscillator 66.

The output of the latching oscillator 66 is connected to an alarm transducer such as a speaker 74. The combination of latching oscillator and speaker will be seen to serve as alarm means. An oscillator reset switch 76 is provided for terminating issuance of an alarm. Generally, this switch is connected to the latching oscillator for selectively grounding out the input circuit of a multivibrator oscillator component as shown by way of example in FIG. 2. After the reset button 76 has been actuated, the subscriber unit 12 is placed in a state ready for reception of future alarm signals from the central office unit 10.

It is presently contemplated that the stepping switch 24 will begin stepping across each telephone line, one line at a time until it completely steps across the normal grouping of lines, usually set at 100 lines. Typically, the subscriber unit 12 requires signal application from the stepping switch ranging from 50 milliseconds to 20 milliseconds before the alarm can be sounded.

Figures 2, 3:
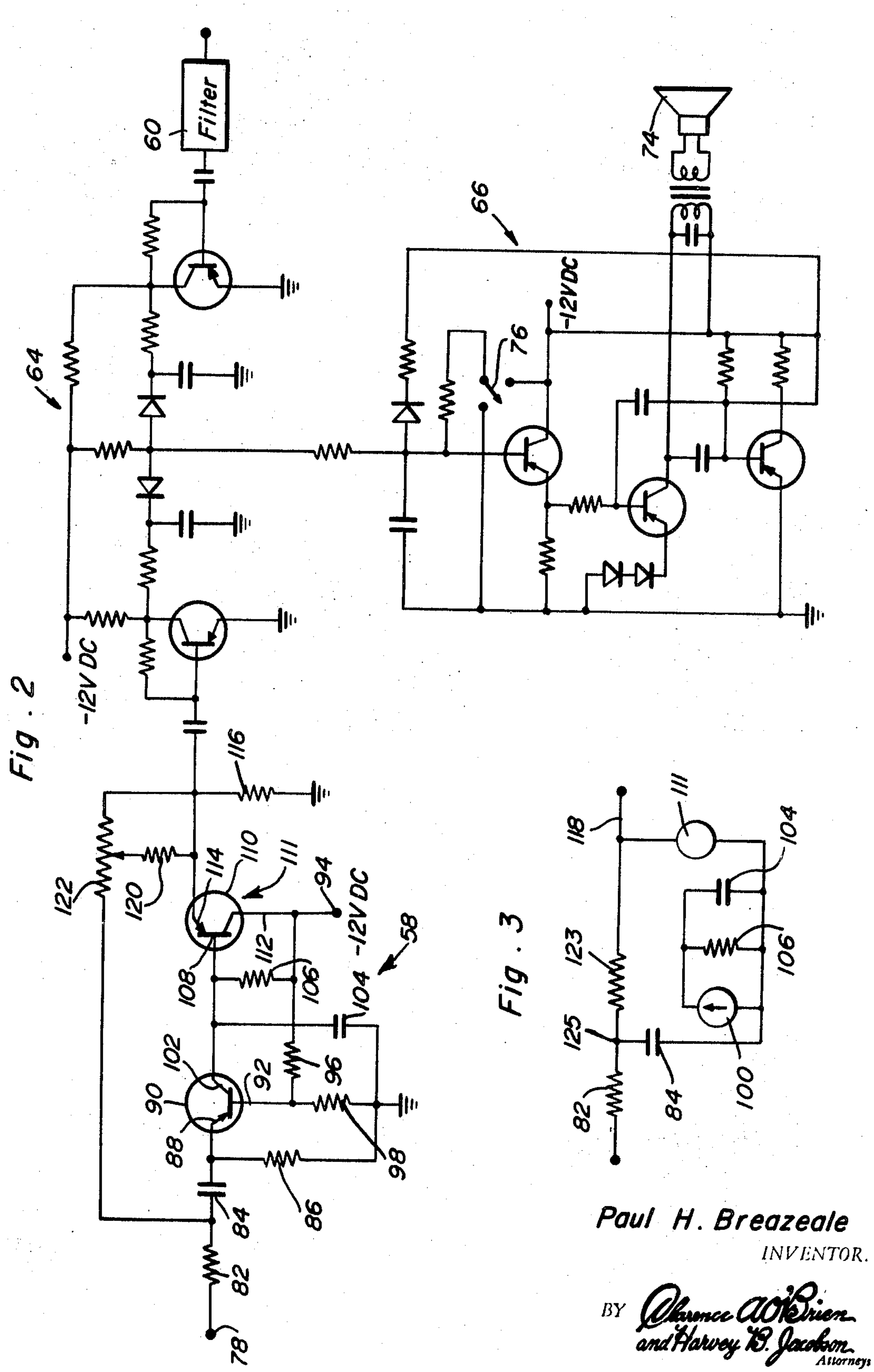
FIG. 2 is an electrical schematic diagram of an active filter utilized in the preferred system.
FIG. 3 is an AC equivalent circuit of the circuit illustrated in FIG. 2.

FIG. 2 illustrates the circuit components including those for each of the filters 58 and 60. The circuit includes an input terminal 78 which feeds a signal from an associated audio generator into the active filter via to a serially connected input resistor 82. The input signal undergoes DC blocking by capacitor 84 that is serially connected between resistor 82 and a grounded resistor 86 across which an input signal is generated that drives the emitter 88 of a PNP-transistor 90. Base 92 of the transistor is biased from a power supply terminal 94 that is connected to base 92 through a voltage divider including resistors 96 and 98. The nodal point between the latter mentioned resistors offers a tapoff to which the base 92 is directly connected. The circuit stage including transistor 90 may be considered a current generator 100 in an AC equivalent circuit of the active filter as illustrated in FIG. 3. A capacitor 104 is connected between the collector 102 of transistor 90 and ground. A resistor 106 connected between collector 102 and power supply terminal 94 effectively connects the resistor to AC ground, in parallel with capacitor 104 as shown in the equivalent circuit. The parallel connected RC combination serves as a tuned output for the transistor stage or current generator 100.

Following the stage employing transistor 90 is an output stage serving to produce a voltage gain substantially equal to one and from which feedback is provided to the first transistor stage. More particularly, the base 108 of a second PNP-transistor 110 is directly coupled to the collector 102 of transistor 90. The collector 112 of transistor 110 is grounded through the power supply terminal 94. The emitter 114 of the transistor 110 serves as an output terminal. In effect, the output stage employing transistor 110 can be represented by an AC equivalent as illustrated and indicated by 111 in FIG. 3. An output voltage is generated across a grounded resistor 116 that is connected to the emitter 114 of transistor 110. The output terminal for the circuit as well as the AC equivalent thereof is indicated by 118.

In order to sustain oscillation in the RC combination 104, 106, a feedback loop is provided between the output of the output stage 111 and the input to the current generator stage 100. More particularly, a resistor 120 is connected between emitter 114 of transistor 110 and the wiper terminal of a potentiometer having its winding terminals connected between the emitter terminal 114 and the nodal point connecting resistor 82 and capacitor 84. Adjustment of potentiometer 122 varies the effective equivalent feedback resistance 123 (FIG. 3) connected between the output terminal 118 and the nodal point 125, the latter connecting resistor 82 and capacitor 84. The feedback signal transmitted through equivalent resistor 123 is coupled to the current generator stage 100 through capacitor 84 thereby completing a feedback loop which sustains oscillation in the output signal derived from the active filter.

In operation of the active filter, when a signal wave of proper frequency appears at the input terminal 78 of the filter, the active filter is actuated and performs a wave shaping function on the input signal. The output signal from the active filter has a more narrow frequency spectrum that is required to actuate the frequency selective input of AND-gate 64 (FIG. 1). It should be noted that the AC equivalent circuit shown in FIG. 3 is valid if the impedance looking into the emitters of transistors 90 and 110 is relatively low and the impedance looking into the base of transistor 114 and the collector of transistor 90 is relatively high. Another requirement for validation of the AC equivalent circuit is that equivalent resistor 123 is substantially smaller than input resistor 82.

Figure 4:
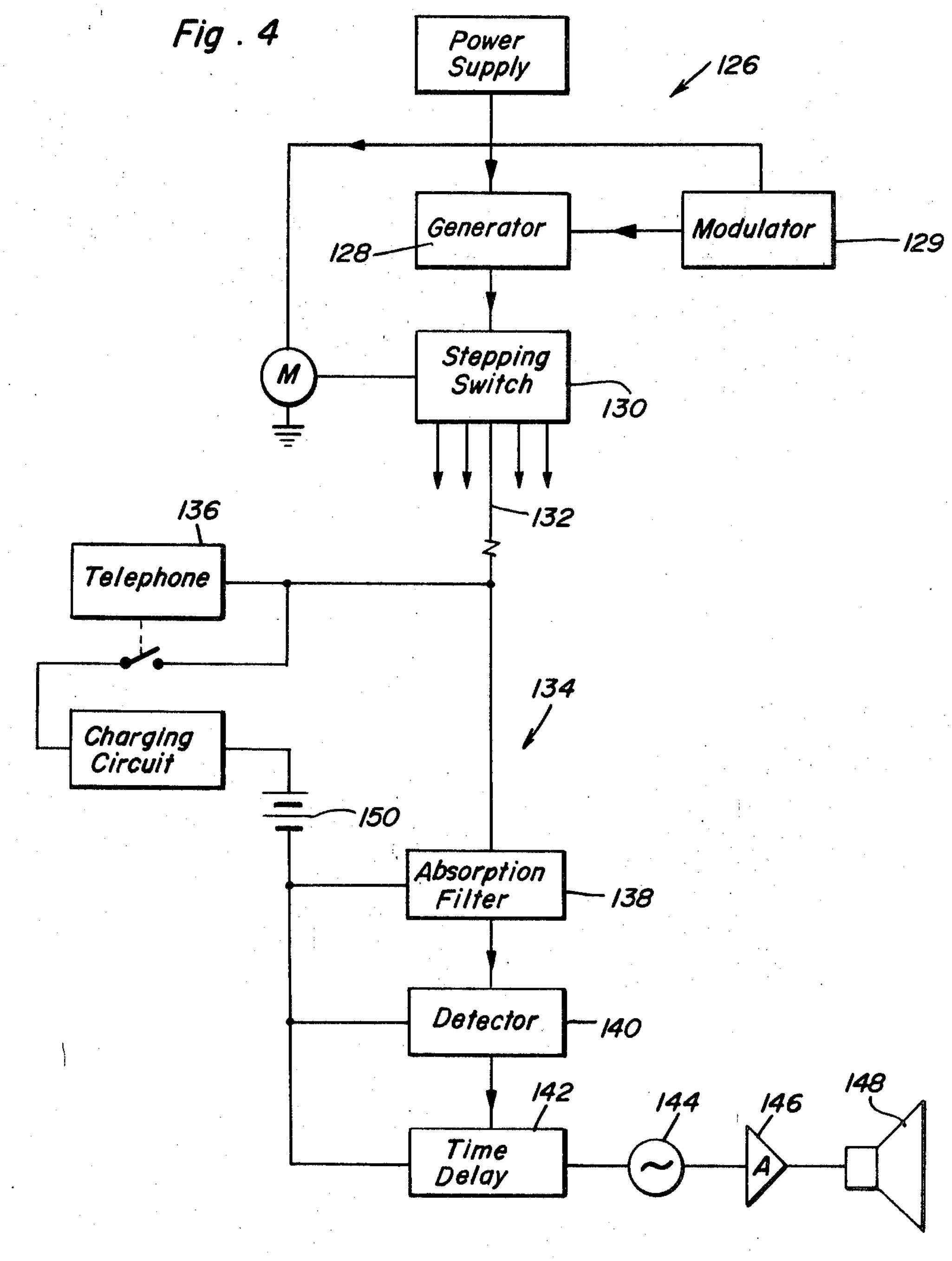
FIG. 4 is a system block diagram of an alternate warning system.

An alternative embodiment of the present invention is depicted in FIG. 4 wherein a simplified central office unit is indicated by 126. This unit includes a single frequency generator 128 the output carrier signal of which is modulated by modulator 129 to supply an alarm signal to a plurality of parallel connected subscriber units through a stepping switch 130 similar to stepping switch 24.

Consideration is now directed to a single subscriber unit located at a subscriber station and connected to the stepping switch 130 through regular telephone lines 132. A particular subscriber unit is generally indicated by reference numeral 134 and has its input connected in parallel with the telephone 136. An alarm signal issued through the stepping switch 130 is fed to an absorption filter 138 which is of the type exhibiting high "Q." The output of the absorption filter 138 is fed to a suitable frequency detector 140. The output of the detector feeds a time delay circuit 142 of suitable conventional design that operates in such a manner that once energized, the delay will maintain a closed circuit condition for several seconds during which time the output of the delay energizes an audio oscillator 144. The output from the oscillator is fed through an amplifier 146 which in turn energizes a transducer preferably a speaker 148. Considering the block diagram of FIG. 4, the oscillator, amplifier and speaker can be considered as an alarm means which effects manifestation of an alarm signal generated from the central office unit 126. The alarm means is powered by a battery 150 that is charged from the telephone lines while the telephone is not in use.

In typical operation of the warning system illustrated in FIG. 4, the central office signal generator 128 is a 2,500-cycle generator modulated with a 50-cycle tone. The stepping switch 130 is actuated when disaster is impending. Each stepping switch 130 could service 100 subscriber lines, one line being contacted at a time. The modulated signal is fed through the switch and communicates with a particular line for 0.06 second (three cycles) and then the switch moves to the next sequential line. Thus, 100 subscriber lines can be contacted in 6 seconds. Although this discussion mentions a stepping switch 130, an electronic counter, such as a ring counter can be employed for sequential switching. The absorption filter having a high "Q" value accepts the 0.06 second signal from the central office modulated signal output. The filter is selective so that it rejects all frequencies other than those to which it is tuned, typically from 2,450 to 2,550 c.p.s. The signal is then passed on to the detector and time delay which energizes the oscillator 144 that can typically be characterized as a local 30 c.p.s. free running oscillator that remains energized and oscillating for three seconds. This oscillation is then amplified and manifested by alarm speaker 148.

Power at the subscriber units can consist of a nickel cadmium battery 150 which accepts 48-volt power from conventional telephone lines in an onhook condition (not in use) and supplies power when a telephone set is in an offhook condition (in use).

Although the aforementioned disclosure addresses itself to utilization of a speaker output at the subscriber unit, with minor modifications easily accomplished in view of the present disclosure, the system can be altered to effect an alarm ringing of the telephone bell or gong instead of or in addition to the speaker alarm.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention as claimed.

I claim:

1. In combination with a communication system having a central station, a plurality of subscriber stations, and at least two conductors connected to each of the subscriber stations and at least two signal lines at the central station adapted to be connected to each of the two conductors associated with the subscriber stations, an emergency warning system comprising switching means for sequentially connecting the signal lines at the central station to each of the two conductors for periods of short duration, filter means connected to the conductors at each of the subscriber stations establishing signals of preselected frequency in response to frequency coded signals transmitted by said conductors during said periods of short duration, signal generating means connected to the signal lines at the central station for continuously generating said frequency coded signals while the switching means is in operation and alerting means connected to the filter means at each of the subscriber stations for generating an alarm in response to signals of said preselected frequency.

2. The combination of claim 1 wherein the signal generating means includes a pair of audio frequency generators respectively connected to the signal lines.

3. The combination of claim 2 wherein the filter means includes a pair of active filter circuits passing signals of different frequencies.

4. The combination of claim 3 wherein said alerting means includes a speaker, latching oscillator means for driving the speaker and detection means for triggering the oscillator means into operation in response to the preselected frequency signals from the filter means.

5. The combination of claim 4 wherein the conductors are telephone lines and the signal lines are tip and ring leads.

6. The combination of claim 1 wherein said alerting means includes a speaker, latching oscillator means for driving the speaker and detection means for triggering the oscillator means into operation in response to the preselected frequency signals from the filter means.

7. The combination of claim 1 wherein the signal lines of the communication system are tip and ring leads coupled to a telephone at each of the subscriber stations by the conductors, said signal generating means including a pair of audio frequency generators connected to the tip and ring leads.

8. The combination of claim 7 wherein the detection means includes an AND gate triggering the oscillator means into operation in response to simultaneous reception of signals from said audiofrequency generators.

9. The combination of claim 1 wherein the switching means includes an emergency triggered stepping switch assembly.

10. The combination of claim 2 wherein each of the active filter circuits comprises a first stage having a current generator section responding to an applied AC signal, wave shaping means connected to the output of the generator section for producing a signal of said preselected frequency and an output stage coupled to the first stage for producing a usable output signal, a signal sustaining feedback path being connected between the output of the output stage and the input of the generator section.

11. The combination of claim 7 wherein said alerting means include a speaker, latching oscillator means for driving the speaker and detection means for triggering the oscillator means into operation in response to the preselected frequency signals from the filter means.

12. The combination of claim 4 wherein the detection means includes an AND-gate triggering the oscillator means into operation in response to simultaneous reception of signals from said audiofrequency generators.

* * * * *